Dec. 15, 1925.

E. HAINKE 1,565,440

TIRE REPAIRING DEVICE

Filed Oct. 19, 1925

Inventor:
Edward Hainke.
By Whiteley and Ruckman
Attorneys.

Patented Dec. 15, 1925.

1,565,440

UNITED STATES PATENT OFFICE.

EDWARD HAINKE, OF GRAND RAPIDS, MINNESOTA.

TIRE-REPAIRING DEVICE.

Application filed October 19, 1925. Serial No. 63,275.

*To all whom it may concern:*

Be it known that I, EDWARD HAINKE, a citizen of the United States, residing at Grand Rapids, in the county of Itasca and State of Minnesota, have invented certain new and useful Improvements in Tire-Repairing Devices, of which the following is a specification.

My invention relates to tire repairing devices. The outer casings of tires frequently have holes cut therein by nails, sharp stones and other sharp articles which may be encountered on the roadway. Such holes are detrimental to the casing and to the inner tube since they permit entrance of water and sand. An object, therefore, of my invention is to provide a tire repairing device by means of which such holes may be closed by rubber plugs inserted from the inside of the casing.

The full objects and advantages of my invention will appear in connection with the detailed description, and the novel features of my inventive idea will be particularly pointed out in the claims.

Figure 3:
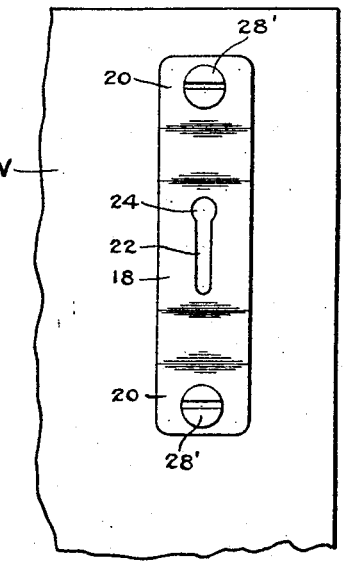
Figure 1:
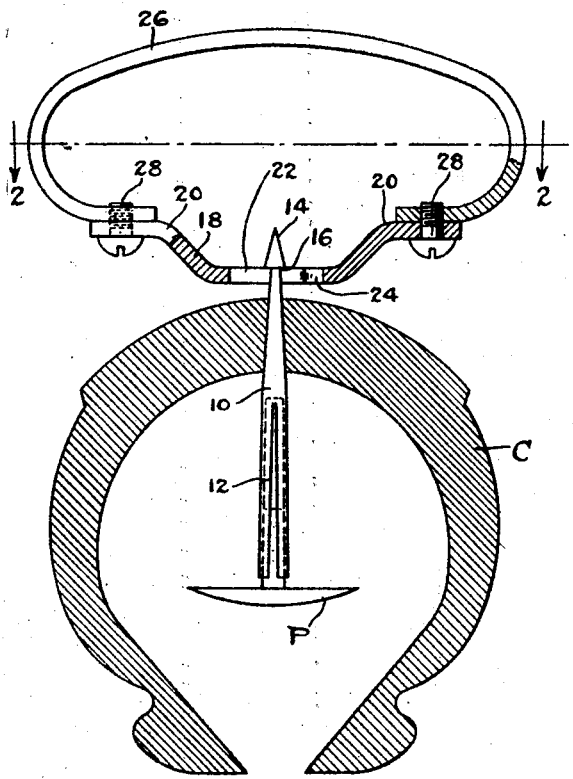
Figure 4:
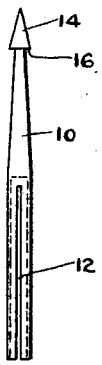
Figure 2:
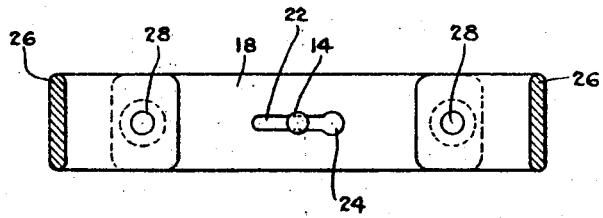

In the accompanying drawings which illustrate a practical embodiment of my invention,—Fig. 1 is a view partly in section and partly in elevation illustrating the manner of using my device in connection with a tire casing. Fig. 2 is a view in section on the line 2—2 of Fig. 1. Fig. 3 is an elevational view of a holder which constitutes part of the device. Fig. 4 is an elevational view of the needle portion of the device.

As shown in the drawings, I provide a needle 10, one end portion of which is hollow and is longitudinally split at two opposite places as indicated by the numeral 12. The body portion of the needle is solid and tapers from the hollow split portion toward the sharp end of the needle which consists of a conical member or head 14 which has its sharp end outward and which provides a shoulder 16 with relation to the body portion. For cooperation with the shoulder 16, I provide a holder which includes a bar 18 having bent ends 20, the body portion being provided with a longitudinal slot 22, one end of which is enlarged at 24 so as to be of sufficient size to permit passage of the head 14 of the needle. As shown in Figs. 1 and 2, the bar 18 is secured to a curved handle 26 by screws 28 passing through the ends of the bar and handle. In the form shown in Fig. 3, the handle is not used but instead the bar 18 is secured to a wall W by screws 28'.

The operation and advantages of my invention will be apparent in connection with the foregoing description. In use, the shank of a rubber plug P is inserted in the hollow split portion of the needle which is of spring-like material such as steel so that the shank of the plug will be gripped. The point of the needle is then pushed through the hole in the casing C from inside the latter as shown in Fig. 1. The head 14 is inserted in the enlarged portion 24 of the slot 22 and then by relative sliding movement brought into engagement with the narrow portion of the slot. In the form shown in Fig. 1, the handle 26 is grasped and the needle carrying the plug with it is drawn through the hole in the casing so that the head of the plug which has cement applied to the flat portion thereof comes into engagement with the inner surface of the casing. Upon continuing to pull on the needle, it will be withdrawn leaving a plug in position and the needle is ready for use in another repair operation. In the form shown in Fig. 3, the casing carrying the needle located therein as shown in Fig. 1, is carried to the place where the bar 18 is attached to the wall and the needle is pulled through in the manner previously described. It will be understood that the end of the plug shank is preferably cut off flush with the outer surface of the casing.

I claim:

1. A tire repairing device comprising a needle having a hollow longitudinally split portion at one end thereof, a sharp head providing a shoulder at the other end of the needle, and a holder adapted to engage said shoulder.

2. A tire repairing device comprising a needle having a hollow longitudinally split portion at one end thereof and a portion tapering toward the other end of the needle, a sharp head providing a shoulder at the outer end of said tapering portion, and a holder adapted to engage said shoulder.

3. A tire repairing device comprising a needle having a hollow longitudinally split portion at one end thereof, a sharp head providing a shoulder at the other end of the needle, and a bar containing a longitudinal slot enlarged at one portion thereof to permit passage of said head.

In testimony whereof I hereunto affix my signature.

EDWARD HAINKE.